United States Patent
Wright et al.

(10) Patent No.: US 8,149,832 B2
(45) Date of Patent: Apr. 3, 2012

(54) METHODS, SYSTEMS, AND COMPUTER PROGRAM PRODUCTS FOR PUSHING AND/OR POPPING MULTIPLE MULTIPROTOCOL LABEL SWITCHING (MPLS) LABELS/SHIM HEADERS AT A SINGLE NODE

(75) Inventors: Steven Allen Wright, Roswell, GA (US); Thomas Arnold Anschutz, Alpharetta, GA (US); James William Rembert, Atlanta, GA (US); Andrew Vernon, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1023 days.

(21) Appl. No.: 10/889,083

(22) Filed: Jul. 12, 2004

(65) Prior Publication Data

US 2006/0007931 A1 Jan. 12, 2006

(51) Int. Cl.
*H04L 12/28* (2006.01)
(52) U.S. Cl. .................. 370/392; 370/390; 370/312
(58) Field of Classification Search .................. 709/202, 709/238; 370/395.1, 392, 474, 466, 467, 370/473, 410, 422, 426, 352, 353, 354, 399, 370/395.3
See application file for complete search history.

(56) References Cited

U.S. PATENT DOCUMENTS

| | | | |
|---|---|---|---|
| 6,751,746 B1 * | 6/2004 | Jain et al. ........................... 714/4 |
| 6,778,531 B1 * | 8/2004 | Kodialam et al. .............. 370/390 |
| 7,623,446 B1 * | 11/2009 | Allan et al. .................... 370/223 |
| 2003/0152024 A1 * | 8/2003 | Yang et al. ..................... 370/216 |
| 2003/0156541 A1 * | 8/2003 | Haihong ....................... 370/235 |
| 2003/0174706 A1 * | 9/2003 | Shankar et al. ............... 370/393 |
| 2004/0052256 A1 * | 3/2004 | Hameleers et al. ........... 370/392 |
| 2005/0125490 A1 * | 6/2005 | Ramia ........................... 709/202 |

OTHER PUBLICATIONS

George Swallow, Cisco Systems, Inc., Mar. 2000.*
George Swallow, CISCo Systems, Inc, Mar. 2000.*
Koren, et al. *IP Header Compression over PPP*, www.ietf.org/rfc/rfc3544.txt, Jul. 2003.
Degermark, et al. *IP Header Compression*, www.ietf.org/rfc/rfc2507.txt, Feb. 1999.

* cited by examiner

*Primary Examiner* — Ricky Ngo
*Assistant Examiner* — David Oveissi
(74) *Attorney, Agent, or Firm* — Myers Bigel Sibley & Sajovec, P.A.

(57) ABSTRACT

An MPLS network is operated by pushing a plurality of MPLS shim headers onto a packet at network node. The packet is replicated to obtain a plurality of packets for transmission on a plurality of paths associated with a plurality of nodes, respectively. At least one MPLS shim header is popped from respective ones of the plurality of packets. The one or more MPLS shim headers that are popped correspond to at least one of the plurality of nodes that is not associated with one of the plurality of paths for which one of the plurality of packets comprising the one or more MPLS shim headers is destined for transmission. The plurality of packets is then transmitted on the plurality of paths, respectively.

13 Claims, 5 Drawing Sheets

METHODS, SYSTEMS, AND COMPUTER PROGRAM PRODUCTS FOR PUSHING AND/OR POPPING MULTIPLE MULTIPROTOCOL LABEL SWITCHING (MPLS) LABELS/SHIM HEADERS AT A SINGLE NODE

FIELD OF THE INVENTION

The present invention relates to communication networks, and, more particularly, to multiprotocol label switching (MPLS) communication networks.

BACKGROUND OF THE INVENTION

Multiprotocol label switching (MPLS) provides a technique for routing packet data based on a label field rather than a destination address. An MPLS network comprises a set of nodes, which are called label switched routers (LSRs), that switch/route packets based on a label that has been added to each packet. Labels are used to define a flow of packets between two nodes or, if packets are being broadcast in a multicast operation, between a source node and multiple destination nodes. A specific path through the LSRs called a label switched path (LSP) is defined for each distinct flow, which is called a forwarding equivalence class (FEC). At intervening nodes in an LSP, an LSR may route the packet based on the MPLS label value, remove the MPLS label (pop a label), and/or impose an additional label (push a label). The label may be removed at the node from the packet at a node that is just prior to the destination node in a particular LSP. This process is sometimes referred to as "penultimate hop popping."

Referring now to FIG. 1, an exemplary MPLS label and Internet Protocol (IP) packet are illustrated. The MPLS label is a 32-bit header that includes a 20-bit label field, a 3-bit Exp field that is reserved for experimental use, a 1-bit S field that is set to one for the oldest entry in the stack and zero for all other entries, and an 8-bit time-to-live (TTL) field that may be used to encode a hop count or time-to-live value. An MPLS label may also be referred to as an MPLS shim header. As shown in FIG. 1, multiple MPLS labels or shim headers may be included in a single IP packet. The MPLS labels or shim headers are organized as a last-in, first-out stack and are processed based on the top MPLS label or shim header. As discussed above, an LSR may add an MPLS label or shim header to the stack (push operation) or remove an MPLS label or shim header from the stack (pop operation).

SUMMARY OF THE INVENTION

According to some embodiments of the present invention, a multiprotocol label switching (MPLS) packet is processed by modifying the packet so as to push or pop a plurality of MPLS shim headers at a network node.

In accordance with other embodiments of the present invention, at least one of the MPLS shim headers comprises a non-routing instruction.

In accordance with still other embodiments of the present invention, a packet communication context is established for the packet. The context comprises an uncompressed version of the plurality of MPLS shim headers. The packet may be modified by pushing or popping a plurality of compressed MPLS shim headers at the network node.

In accordance with still other embodiments of the present invention, the plurality of MPLS shim headers are compressed by replacing static information in the plurality of MPLS shim headers with a context identification field that identifies the context.

In still further embodiments of the present invention, an MPLS network is operated by pushing a plurality of MPLS shim headers onto a packet at a node. The packet is replicated to obtain a plurality of packets for transmission on a plurality of paths associated with a plurality of nodes, respectively. At least one MPLS shim header is popped from respective ones of the plurality of packets. The one or more MPLS shim headers that are popped correspond to at least one of the plurality of nodes that is not associated with one of the plurality of paths for which one of the plurality of packets comprising the one or more MPLS shim headers is destined for transmission. The plurality of packets is then transmitted on the plurality of paths, respectively.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
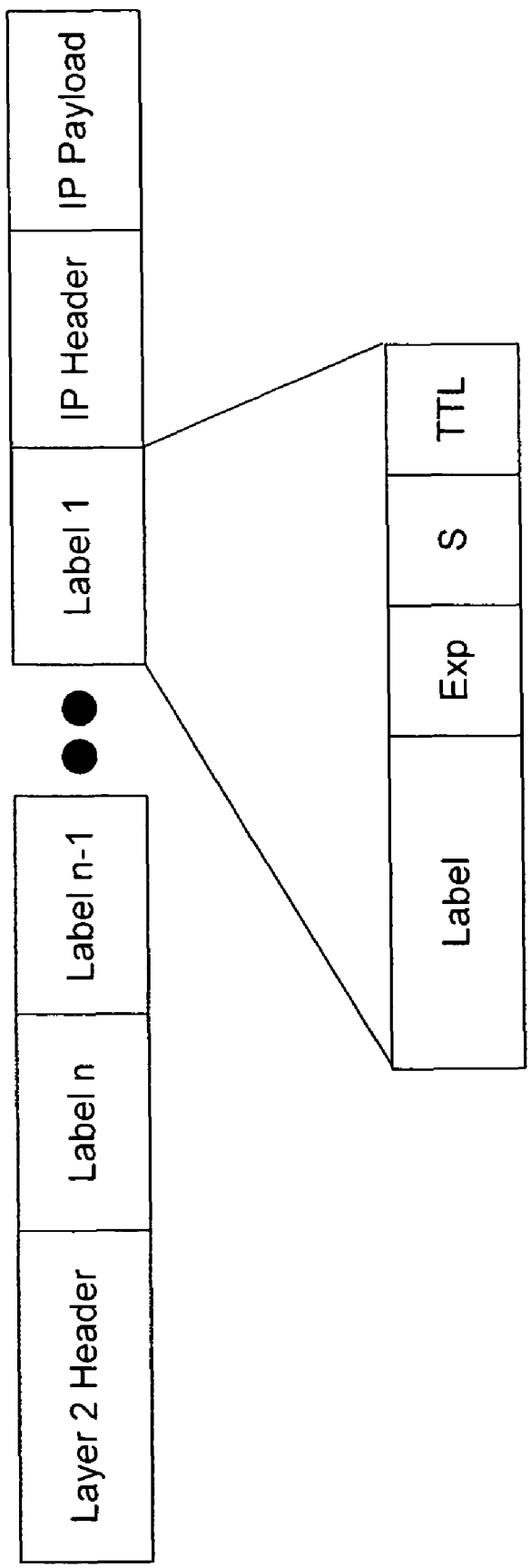
FIG. 1 is a block diagram that illustrates a conventional multiprotocol label switching (MPLS) label or shim header and internet protocol (IP) packet.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
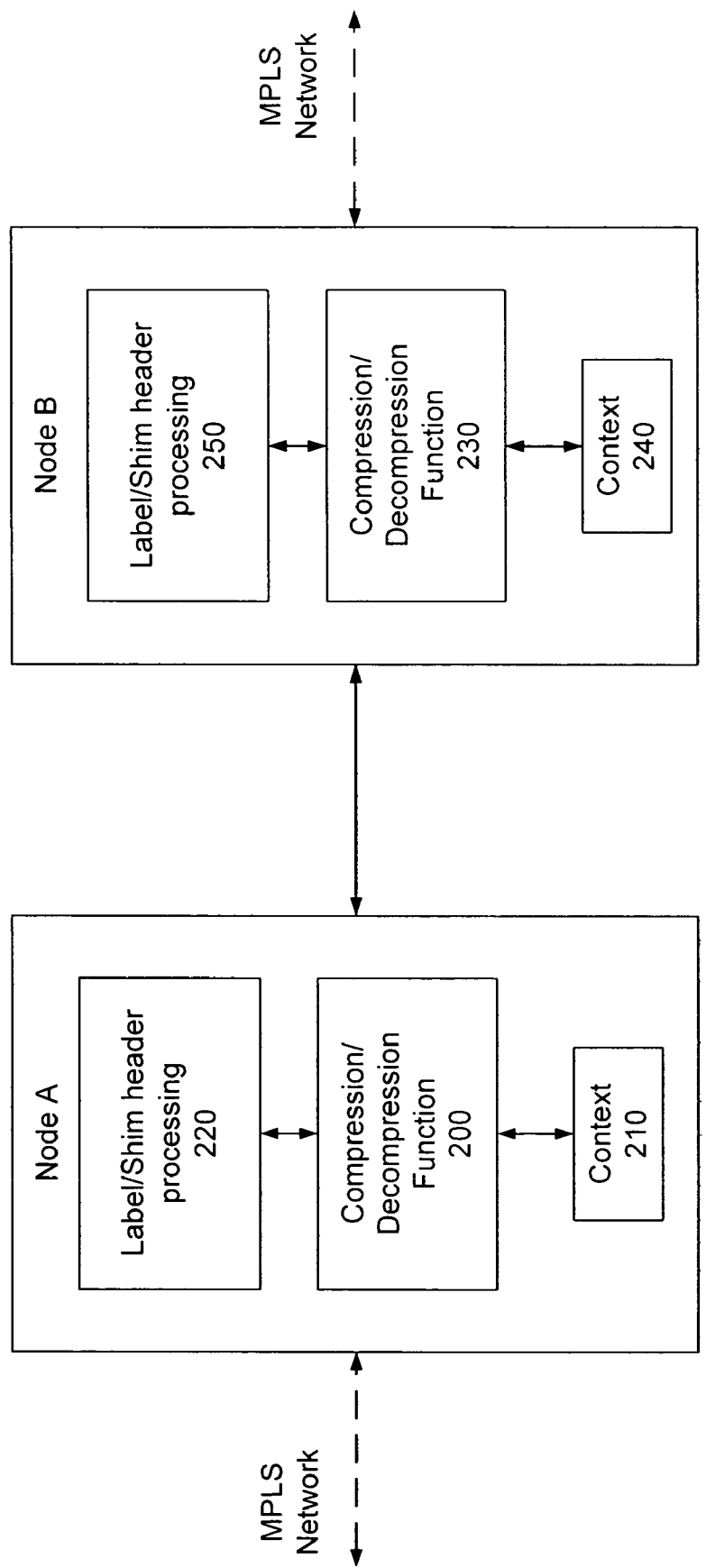
FIG. 2 is a block diagram that illustrates an MPLS network in accordance with some embodiments of the present invention.

Referring now to FIG. 2, two nodes or label switch routers (LSRs) in a multiprotocol label switching (MPLS) network, in accordance with some embodiments of the present invention, are illustrated. As shown in FIG. 2, Node A comprises an optional compression/decompression function module 200, a context module 210, and a label/shim header processing module 220. Likewise, Node B comprises an optional compression/decompression function module 230, a context module 240, and a label/shim header processing module 250. The optional compression/decompression function modules 200 and 230 may be configured to reduce the size of an Internet Protocol (IP) packet by compressing a single MPLS label or shim header or by compressing multiple MPLS labels or shim headers. In accordance with some embodiments of the present invention, the optional compression/decompression function modules 200, 230 may compress an MPLS label or shim header by replacing the uncompressed static information in the MPLS label or shim header with a context identification field. The uncompressed static information is stored at both nodes as context 210 and context 240. Node A and Node B may decompress a packet having a compressed MPLS label or shim header by using an association between the context identification field in the packet and the context 210 and 240, respectively.

Figure 3:
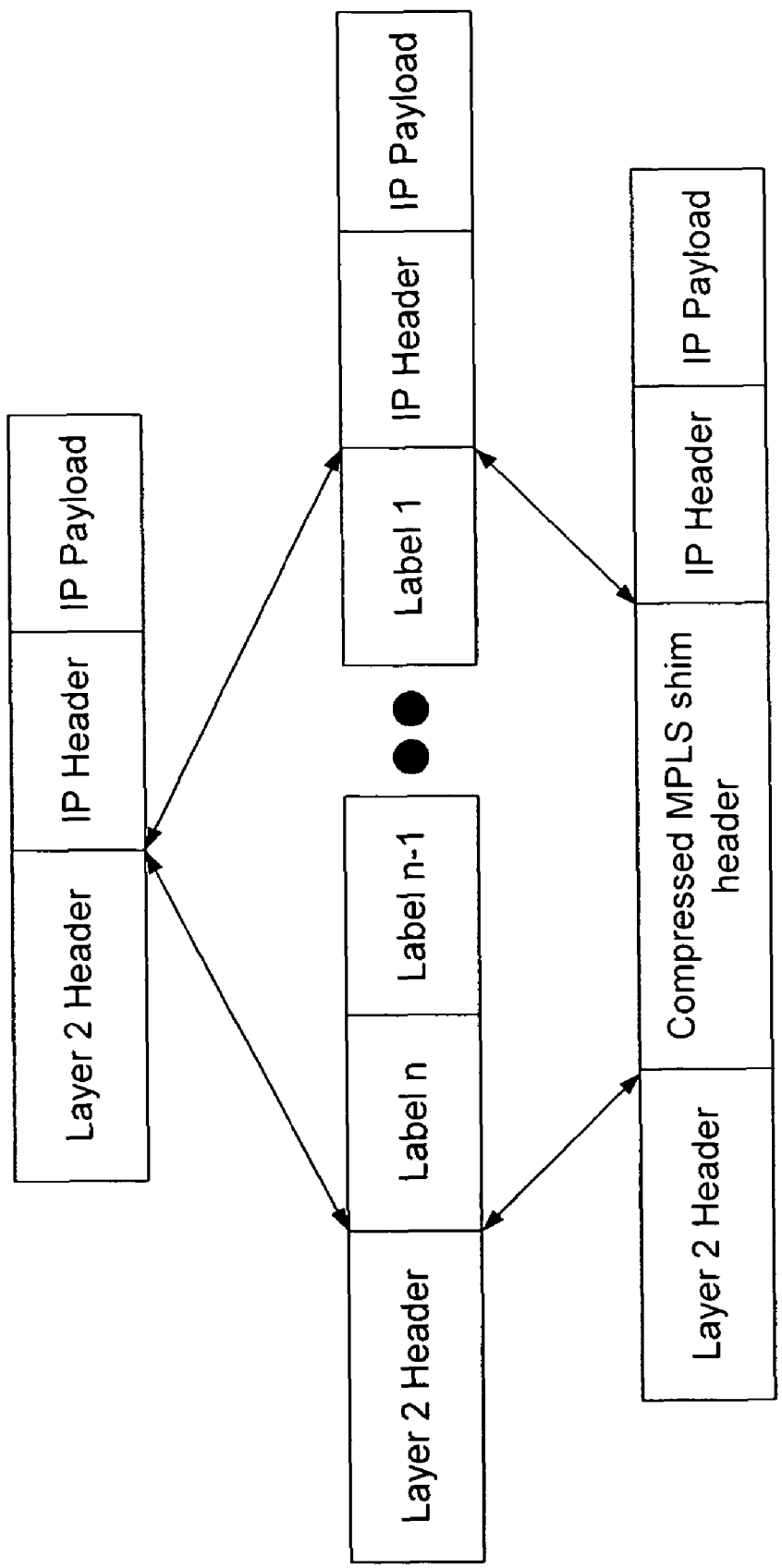
FIG. 3 is a block diagram that illustrates pushing and popping of multiple MPLS labels or shim headers on to or from a packet and compression of multiple MPLS labels or shim headers in accordance with some embodiments of the present invention.

Nodes A and B also include label/shim header processing modules 220 and 250, which may be used to modify a MPLS packet by pushing or popping a plurality of MPLS labels or shim headers at a single node in the network. For example, referring now to FIG. 3, multiple MPLS labels or shim headers may be pushed onto an IP packet or popped from an IP packet. In particular embodiments of the present invention, one or more of the MPLS labels or shim headers may contain a non-routing instruction. Moreover, as shown in FIG. 3, after pushing the multiple labels or shim headers onto a packet, the MPLS labels or shim headers may be compressed as discussed above. One use of such functionality may be for multicast transmissions where a stack of labels or shim headers may be used to identify an explicit set of endpoints for a multicast service. An exemplary multicast application, in accordance with some embodiments of the present invention, will be described below.

Although FIG. 2 illustrates an exemplary MPLS network, it will be understood that the present invention is not limited to such configurations, but is intended to encompass any configuration capable of carrying out the operations described herein. It will be appreciated that, in accordance with some embodiments of the present invention, the functionality of the compression/decompression functions 200 and 230, the context modules 210 and 240, and the label/shim header processing modules 220 and 250 may be implemented using discrete hardware components, one or more application specific integrated circuits (ASICs), a programmed digital signal processor or microcontroller, a program stored in a memory and executed by a processor, and/or combinations thereof. In this regard, computer program code for carrying out operations of the compression/decompression functions 200 and 230, the context modules 210 and 240, and the label/shim header processing modules 220 and 250 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
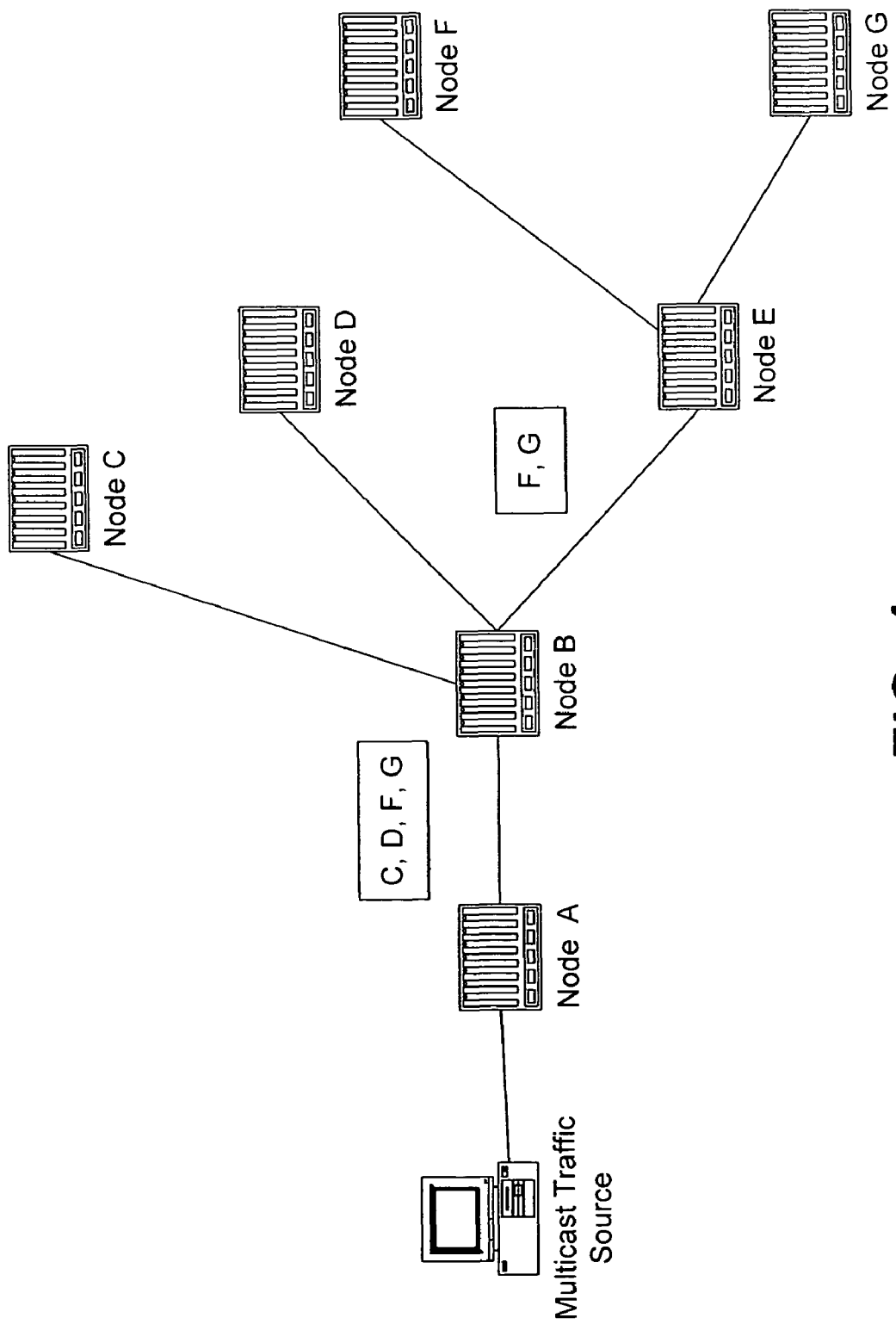
FIG. 4 is a diagram of an MPLS network configured for a multicast application in accordance with some embodiments of the present invention.
Figure 5:
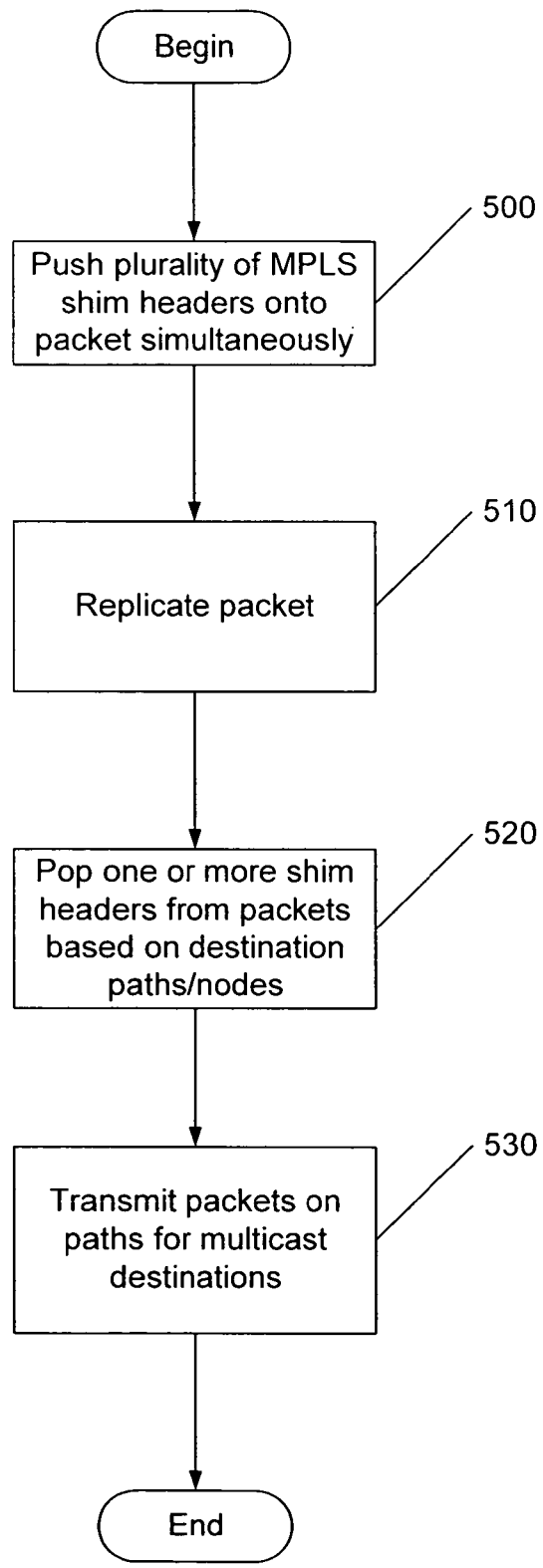
FIG. 5 is a flowchart that illustrates operations for multicasting MPLS packets in accordance with some embodiments of the present invention.

Referring now to FIGS. 4 and 5, operations for multicasting an MPLS packet in accordance with some embodiments of the present invention will now be described. Referring now to FIG. 4, an exemplary MPLS multicast network comprises a multicast traffic source that is in communication with a Node A in an MPLS network. The MPLS network further comprises Nodes B, C, D, E, F, and G. These nodes may be referred to as label switched routers (LSRs) in the MPLS network.

Referring now to FIG. 5 with frequent reference to FIG. 4, the multicast traffic source provides a packet stream to Node A that is to be multicast to Nodes C, D, F, and G. At block 500, Node A, which may be configured with a label/shim header processing module 220 or 250 as discussed above with respect to FIG. 2, pushes labels or shim headers corresponding to the multicast Nodes C, D, F, and G onto a packet in the packet stream from the multicast traffic source. At Node B, the packet having the labels or shim headers corresponding to the multicast destinations is replicated at block 510. Node B, which may also be configured with a label/shim header processing module 220 or 250 as discussed above with respect to FIG. 2, pops all of the labels corresponding to Nodes C, D, F, and G from the packets that are destined for Nodes C and D at block 520. For the packet that is destined for node E, however, only the labels or shim headers corresponding to Nodes C and D are popped from that packet at block 520. At block 530, the packets are transmitted to Nodes C, D, and E from Node B.

The operations of blocks 510, 520, and 530 may be repeated at Node E to transmit packets to the final two destination Nodes F and G. At block 510, packet having the labels or shim headers corresponding to Nodes F and G is replicated. At block 520, Node E, which may be configured with a label/shim header processing module 220 or 250 as discussed above with respect to FIG. 2, pops the labels or shim headers corresponding to Nodes F and G from the packets that are destined for Nodes F and G. Finally, at block 530, Node E transmits the packets to the final two multicast destination nodes F and G.

Thus, pushing and/or popping multiple MPLS labels or shim headers at a single node in the network may be used to facilitate a multicast transmission of MPLS packets in an MPLS network in accordance with some embodiments of the present invention.

The flowchart of FIG. 5 illustrates the architecture, functionality, and operations of some embodiments of methods, systems, and computer program products for pushing and/or popping multiple MPLS labels or shim headers in a multicast environment. In this regard, each block represents a module, segment, or portion of code, which comprises one or more executable instructions for implementing the specified logical function(s). It should also be noted that in other implementations, the function(s) noted in the blocks may occur out of the order noted in FIG. 5. For example, two blocks shown in succession may, in fact, be executed substantially concurrently or the blocks may sometimes be executed in the reverse order, depending on the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating a multiprotocol label switching network to perform multicast communications, comprising:
    pushing a plurality of multiprotocol label switching shim headers simultaneously onto a packet at a node;
    replicating the packet at the node to obtain a plurality of packets for transmission on a plurality of paths associated with a plurality of nodes, respectively, wherein each of the plurality of packets is to be transmitted to a different ultimate destination;
    popping at least one multiprotocol label switching shim header from respective ones of the plurality of packets at the node, the at least one multiprotocol label switching shim header corresponding to at least one of the plurality of nodes that is not associated with one of the plurality of paths for which one of the plurality of packets comprising the at least one multiprotocol label switching shim header is destined for transmission; then
    transmitting the plurality of packets on the plurality of paths to the different ultimate destinations, respectively.

2. The method of claim 1, further comprising:
    establishing a packet communication context for the packet, the context comprising an uncompressed version of the plurality of multiprotocol label switching shim headers;
    compressing the plurality of multiprotocol label switching shim headers; and
    wherein pushing the plurality of multiprotocol label switching shim headers comprises pushing the plurality of compressed multiprotocol label switching shim headers onto the packet at the node.

3. The method of claim 2, wherein compressing the plurality of multiprotocol label switching shim headers comprises replacing static information in the plurality of multiprotocol label switching shim headers with a context identification field that identifies the context.

4. A system for operating a multiprotocol label switching network, comprising:
    means for pushing a plurality of multiprotocol label switching shim headers simultaneously onto a packet at a node;
    means for replicating the packet at the node to obtain a plurality of packets for transmission on a plurality of paths associated with a plurality of nodes, respectively, wherein each of the plurality of packets is to be transmitted to a different ultimate destination;
    means for popping at least one multiprotocol label switching shim header from respective ones of the plurality of packets at the node, the at least one multiprotocol label switching shim header corresponding to at least one of the plurality of nodes that is not associated with one of the plurality of paths for which one of the plurality of packets comprising the at least one multiprotocol label switching shim header is destined for transmission; and
    means for transmitting the plurality of packets on the plurality of paths to the different ultimate destinations, respectively.

5. The system of claim 4, further comprising:
    means for establishing a packet communication context for the packet, the context comprising an uncompressed version of the plurality of multiprotocol label switching shim headers;
    means for compressing the plurality of multiprotocol label switching shim headers; and
    wherein the means for pushing the plurality of multiprotocol label switching shim headers comprises means for pushing the plurality of compressed multiprotocol label switching shim headers onto the packet at the node.

6. The system of claim 5, wherein the means for compressing the plurality of multiprotocol label switching shim headers comprises means for replacing static information in the plurality of multiprotocol label switching shim headers with a context identification field that identifies the context.

7. A computer program product for operating a multiprotocol label switching network, comprising:
    a computer readable storage medium having computer readable program code embodied therein, the computer readable program code comprising:
    computer readable program code configured to push a plurality of multiprotocol label switching shim headers simultaneously onto a packet at a node;

computer readable program code configured to replicate the packet at the node to obtain a plurality of packets for transmission on a plurality of paths associated with a plurality of nodes, respectively, wherein each of the plurality of packets is to be transmitted to a different ultimate destination;

computer readable program code configured to pop at least one multiprotocol label switching shim header from respective ones of the plurality of packets at the node, the at least one multiprotocol label switching shim header corresponding to at least one of the plurality of nodes that is not associated with one of the plurality of paths for which one of the plurality of packets comprising the at least one multiprotocol label switching shim header is destined for transmission; and computer readable program code configured to transmit the plurality of packets on the plurality of paths to the different ultimate destinations, respectively.

8. The computer program product of claim 7, further comprising:

computer readable program code configured to establish a packet communication context for the packet, the context comprising an uncompressed version of the plurality of multiprotocol label switching shim headers;

computer readable program code configured to compress the plurality of multiprotocol label switching shim headers; and wherein the computer readable program code configured to push the plurality of multiprotocol label switching shim headers comprises computer readable program code configured to push the plurality of compressed multiprotocol label switching shim headers onto the packet at the node.

9. The computer program product of claim 8, wherein the computer readable program code configured to compress the plurality of multiprotocol label switching shim headers comprises computer readable program code configured to replace static information in the plurality of multiprotocol label switching shim headers with a context identification field that identifies the context.

10. A method of transmitting a multicast communication over a multiprotocol label switching network, the method comprising:

receiving a packet containing at least part of the multicast communication;

pushing a plurality of multiprotocol label switching shim headers simultaneously onto the packet at a node;

replicating the packet at the node to obtain at least a first packet that is to transmitted via the multiprotocol label switching network to a first destination node via a first transmission path and a second packet that is to transmitted via the multi protocol label switching network to a second destination node via a second transmission path;

popping from the first packet one of the plurality of multiprotocol label switching shim headers that corresponds to the second destination node at the node; and transmitting the first packet on its way to the first destination node via the first transmission path and transmitting the second packet on its way to the second destination node via the second transmission path.

11. The method of claim 10, further comprising popping from the second packet one of the plurality of multiprotocol label switching shim headers that corresponds to the first destination node at the node.

12. The method of claim 11, further comprising replicating the packet at the node to obtain a third packet that is to be transmitted via the multiprotocol label switching network to a third destination node and popping from the first packet one of the plurality of multiprotocol label switching shim headers that corresponds to the third destination node at the node.

13. The method of claim 10, wherein the first and second packets are a subset of a plurality of packets that are generated by replicating the received packet, wherein the first and second destination nodes are a subset of a plurality of destination nodes, and wherein each of the plurality of packets are to be transmitted to a respective one of the plurality of destination nodes, where the method further comprises popping from the first packet of the plurality of packets any of the plurality of multiprotocol label switching shim headers that correspond to a one of the plurality of destination nodes that is not on the first transmission path at the node.

* * * * *